F. W. HOCHSTETTER.
SHUTTER AND COLOR SCREEN DEVICE FOR MOVING PICTURE MACHINES.
APPLICATION FILED JUNE 14, 1916.
1,247,273.　　　　　　　　　　　　　　Patented Nov. 20, 1917.
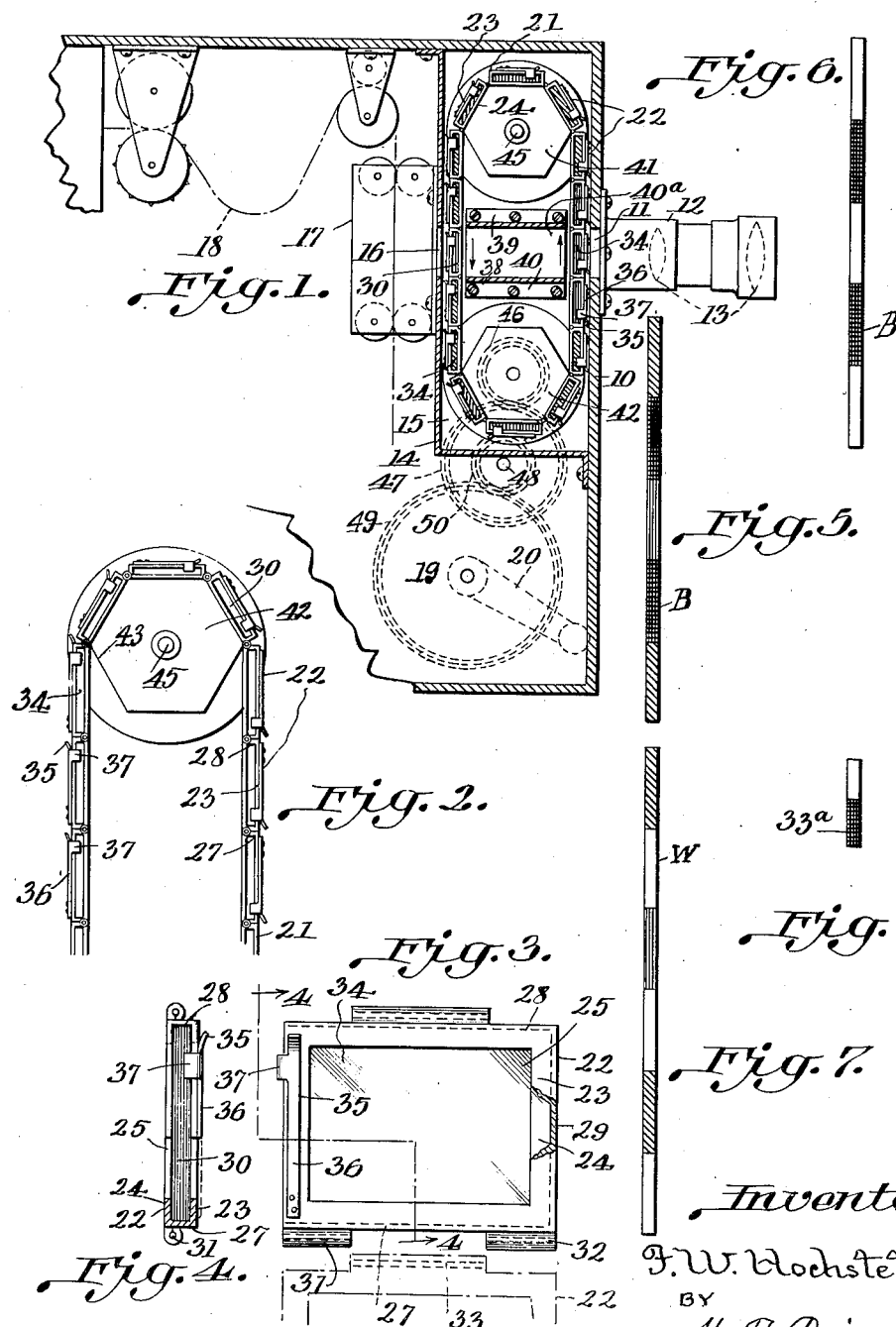
Inventor:
F. W. Hochstetter
BY
W. T. Criswell.
Atty.

UNITED STATES PATENT OFFICE.

FREDERICK W. HOCHSTETTER, OF NEW YORK, N. Y., ASSIGNOR TO H. P. PATENTS AND PROCESSES COMPANY, INC., A CORPORATION OF NEW YORK.

SHUTTER AND COLOR-SCREEN DEVICE FOR MOVING-PICTURE MACHINES.

1,247,273.  Specification of Letters Patent.  Patented Nov. 20, 1917.

Application filed June 14, 1916. Serial No. 103,640.

*To all whom it may concern:*

Be it known that I, FREDERICK W. HOCHSTETTER, a citizen of the United States, and a resident of the city of New York, in the county and State of New York, have invented certain new and useful Improvements in Shutter and Color-Screen Devices for Moving-Picture Machines, of which the following is a full, clear, and exact specification.

This invention relates to a class of devices adapted to be used in conjunction with machines for producing moving pictures.

My invention has for its object primarily to provide a shutter and color screen device designed to be used upon a camera and a projecting apparatus for producing and exhibiting moving pictures of living objects, or scenery, in black and white effects, or in their natural colors, and in which is employed a plurality of apertured hollow sections, or frames, which are pivoted together in the form of an endless belt which is adapted to be transmitted so that the apertures of the sections will intermittently register with the exposure window of the camera, or projecting apparatus, for permitting rays of light to be directed upon a sensitized film when the pictures are being produced, or upon the finished pictures of the film, when being exhibited.

Another object of the invention is to form the sections of the belt whereby either opaque plates, or transparent color plates, or color screens, or a combination of opaque plates and color screens may be interchangeably employed in various ways to permit the device to be effectually used for making and exhibiting animated pictures in colors, or black and white effects, without requiring the use of the ordinary types of shutters to cut off the light.

Still another object of this invention is to provide interchangeable plates with means for removably holding the same in the frames or sections against accidental displacement.

A further object of the invention is to provide angular forms or rollers for guiding the movement of the apertured belt, and a still further object of the invention is the provision of means for operating the shutter or device in unison with the operation of the camera, or projecting apparatus.

Other objects of the invention will in part be obvious and will in part be pointed out by reference to the accompanying specification and drawing forming a part thereof, in which like reference characters are used to indicate like parts throughout the several views.

In the drawing, Figure 1 is a fragmentary section, partly in detail, through a camera or projecting apparatus showing one form of shutter embodying my invention applied thereto.

Fig. 2 is an enlarged fragmentary end view of part of the apertured belt, and one of the hexagonal rollers used with the shutter.

Fig. 3 is an enlarged front elevation, partly in section, of one of the sections of the apertured belt.

Fig. 4 is a view, partly in section, taken on the line 4—4 of Fig. 3.

Figs. 5, 6, and 7 are diagrammatic views of a modified form of shutter showing a possible arrangement of plates.

Fig. 8 shows a modified form of plate having a part thereof opaque and the rest transparent or colored as desired.

The shutter and color screen device may be applied to any suitable type of camera for producing photographic prints of living objects and scenery, or may be used in conjunction with a projecting apparatus for exhibiting the pictures either in black and white effects, or in their natural colors, the said camera, or projecting apparatus preferably having a casing 10 in the front wall of which is an exposure window 11, and to the front wall at said exposure window is connected a telescopic barrel 12 carrying one or more lenses 13. Part of the interior of the casing 10 at the upper front portion thereof is partitioned, at 14 to provide a chamber 15, and through said partition is an opening 16 which is in register with the exposure window 11. To the partition 14 is fastened any desired form of framing device, as 17, adapted to intermittently guide the picture film 18 so as to be exposed to the light focused from the lenses 13 through the window 11 and through the opening 16, the said film being transmitted through the machine by any suitable form of mechanism which is operated by the rotation of a drive shaft, as 19, having a crank handle 20 held thereon.

The shutter or color screen has a number of successive apertured sections, or frames 21 all of which are preferably alike in formation, and these sections may be substantially rectangular or any other suitable shape so as to be arranged in preferably the form of an endless belt, as shown. Each of the sections 22 has a front plate 23 and a back plate 24 which is spaced from the front plate to provide a hollow interior therebetween, and through both of these plates are registered apertures to form a passage through each section. The passages 25 may be of any desired dimensions, and these passages are adapted to be consecutively registered with the exposure window 11 of the casing 10 and with the opening 16 of the partition 14. The lower longitudinal edges of the plates 23 and 24 of each section are connected by a bottom wall 27, and the upper longitudinal edges of these plates are connected by a top wall 28, while one of the corresponding ends of the plates of each of the sections are connected by an end wall 29. Thus each section has an open end 30. Extending from the bottom wall 27 of each of the apertured hollow sections 22 are two spaced lugs or ears 31 and 32 having registered longitudinally disposed holes therethrough, and projecting from the top wall 28 of each section is a lug or ear 33 also having a longitudinally disposed hole adapted to be registered with the holes of the lugs 31 and 32 of the next adjacent section. All the sections 22 are linked or hinged together to form an endless belt by arranging the sections so that the lugs 33 of each section will be disposed between the lugs 31 and 32 of the next sections, and a pin is passed through the registered holes of each of the assembled sets of the lugs. The endless belt when formed in this manner is arranged in the chamber 15 of the casing 10 so that the passages 25 of the sections will consecutively register with the exposure window 11 and with the opening 16 of the partition 14 of the casing 10 for permitting rays of light to be focused therethrough from the lenses 13.

When the device is used in conjunction with a camera for producing the negatives of animated pictures in black and white effects, and also when used in conjunction with a projecting apparatus for exhibiting the pictures, an opaque plate, as B, may be inserted in each alternate section, or a plate 33ª having a transparent portion and an opaque portion may be used in each section, the passages 25 through the sections being of suitable dimensions so that the light will be properly cut-off at intervals. When the device is employed with a camera for producing the negatives of animated pictures in natural colors and also used with a projecting apparatus for exhibiting the pictures, a color-screen or transparent color plate, as 34, of glass, or other material may be mounted in the sections in any desired order, the colors of the plates being separately red, green or any of the other primary colors, or instead thereof combination plates of one or more transparent colors with an opaque portion may be used, while in instances by making the belt of a suitable length and by arranging the color-screens in the desired groups, an effective combination of moving pictures in black and white effects as well as colors may be produced and exhibited on one film. The color plates and the opaque plates or portions are arranged in the same relative positions in the projecting apparatus as they occupied when the pictures were taken, and the developing of the negatives may be accomplished by the usual or any special means.

The plates are interchangeably mounted in the sections of the belt by being inserted in the open ends thereof, and to permit the plates to be removably held in the sections each is provided with a catch, as 35, all of which are similarly formed. Each of the catches 35 is composed of a strip of metal 36 having one of its ends secured to one of the plates of each of the sections, and adjacent to the free end of each strip is a lug 37 which is bent at a right angle with respect to the strip so as to be disposed in a direction transversely of the open end of each of the sections of the belt. By manually moving the free end of the strip 36 of each of the catches in a direction from its hollow section, the lug 37 will be directed from the open end of the section to allow one of the plates 33ª or 34 to be inserted therein, and by then releasing the strip its tension will reversely swing the catch so that its lug will again be guided transversely of the open end of the section, thereby preventing the plate from being accidentally displaced when the belt is revolubly moved in the chamber 15. By providing for the interchangeable use of opaque plates and color screens in this manner the use of shutters of the ordinary types in conjunction with moving picture machines may be dispensed with, or in instances any suitable form of shutters may be employed if desired. While I have illustrated and described an endless belt of a specific form it will be understood that any form of belt having openings in which opaque or transparent plates may be removably applied thereto may be employed instead thereof.

Transversely of the interior of the chamber 15 and centrally of the belt 21 are two parallel spaced plates 38 and 39 the space between which provides a light well 40ª in register with the exposure window 11 of the casing 10 and with the opening 16 of the partition 14 whereby the light admitted through this window and opening and through the passages of the sections of the belt may be prevented from being deflected into the chamber 15.

Serving to guide the endless belt 21 so that the passages 25 of the sections thereof will consecutively register with the exposure window 11 of the casing 10, the belt is guided over two rollers, as 41 and 42, one of which is in the lower part of the chamber 15 and the other is in the upper part of said chamber. The peripheries of the rollers 41 and 42 are hexagonal in shape to provide a plurality of angularly disposed faces 43 so that the sections of the belt will fit thereupon when being moved. Projecting from both ends of each of the rollers 41 and 42 are studs such as 45 which are journaled in the side walls of the casing 10, and upon one of the studs of the roller 41 is held a gear 46 which is in mesh with a gear 47 provided upon a shaft 48 which is journaled in the side walls of the casing 10. Also upon the shaft 48 is a gear 50 which is in mesh with a gear 49 held upon the drive shaft 19.

When the shaft 19 is driven by operating the crank handle 20 rotation will be imparted to the gears 50 and 49 for revolving the shaft 48, gear 47, and the gear 46. The roller 42 will thereby be revolved, and in turn the belt 21 will be circumferentially moved for transmitting the apertured hollow sections of the belt across the optical axis of the lens of the camera or projecting apparatus. By providing the gears 46, 47, 49 and 50 of relative diameters the belt may be transmitted at any desired speed.

From the foregoing it will be obvious that as the belt 21 moves in the direction of the arrows, the color plates 34 will aline with the light openings in such manner that first two red plates will intersect the light rays, as shown in Fig. 1, thereby transmitting only the red color values; next a red and a green plate will be moved into the path of the rays thereby cutting off all red and green light values, the device in this position acting substantially as a shutter; and then two green plates will be moved to operative position to permit the transmission of the green color values. Fig. 5 illustrates diagrammatically an arrangement of colored plates and non-transparent plates B for producing the same result, while Figs. 6 and 7 show respectively a possible arrangement of non-transparent plates B and transparent plates W for black and white pictures, and colored plates and transparent plates for use with an ordinary shutter. This arrangement of plates, as well as the colors used, may be changed to suit climatic conditions and to accommodate the devices to different types of machines. It will be understood that the different arrangements shown are illustrative only, and do not show all of the positions which may be advantageously used.

In the foregoing description, I have embodied the preferred form of my invention, but I do not wish to be understood as limiting myself thereto, as I am aware that modifications may be made therein without departing from the principle, or sacrificing any of the advantages of this invention, therefore, I reserve to myself the right to make such changes as fairly fall within the scope of the appended claims.

Having thus described my invention what I claim is:—

1. A device of the class described, comprising the combination with a camera or projecting apparatus, of an endless belt having both runs of said belt disposed to intercept the passage of light rays to and from said apparatus, said belt comprising a plurality of members each adapted to removably support a color plate of any desired color value.

2. A device of the class described, comprising the combination with a camera or projecting apparatus, of an endless belt having both runs thereof disposed to intercept the passage of light rays to and from said apparatus, said belt comprising a plurality of pivotally connected members each operated to slidably receive a removable color plate of any desired color value.

3. A shutter and color screen device for motion picture apparatus comprising a plurality of frame-like members, means for pivotally connecting said members to form an endless belt, and means carried by each of said members for detachably securing a color plate of suitable color value in position therein.

4. A shutter and color screen device for motion picture apparatus comprising an endless belt composed of a plurality of inter-connected members, a color plate of any desired color value carried by each member, and means for removably securing each of said color plates in position.

FREDERICK W. HOCHSTETTER.